(12) United States Patent
Kim et al.

(10) Patent No.: US 8,274,549 B2
(45) Date of Patent: Sep. 25, 2012

(54) DUAL VIEW DISPLAY PANEL

(75) Inventors: Tae-Woo Kim, Suwon-si (KR); Sang-Hoon Yim, Suwon-si (KR)

(73) Assignee: Samsung Mobile Display Co., Ltd., Nongseo-Dong, Giheung-Gu, Yongin, Gyunggi-Do (KR)

( * ) Notice: Subject to any disclaimer, the term of this patent is extended or adjusted under 35 U.S.C. 154(b) by 1414 days.

(21) Appl. No.: 11/898,367

(22) Filed: Sep. 11, 2007

(65) Prior Publication Data

US 2008/0061305 A1    Mar. 13, 2008

(30) Foreign Application Priority Data

Sep. 12, 2006   (KR) .................. 10-2006-0088137

(51) Int. Cl.
*H04N 7/00* (2011.01)
(52) U.S. Cl. .............................. 348/36; 348/32; 348/54
(58) Field of Classification Search .................... 348/32, 348/36, 54; 359/462, 463
See application file for complete search history.

(56) References Cited

U.S. PATENT DOCUMENTS

| 7,154,653 | B2 * | 12/2006 | Kean et al. ............... 359/462 |
| 7,425,951 | B2 * | 9/2008 | Fukushima et al. ........ 348/54 |
| 2007/0018585 | A1 * | 1/2007 | Ijzerman et al. .......... 315/15 |
| 2007/0046881 | A1 * | 3/2007 | Takei ....................... 349/139 |
| 2008/0043092 | A1 * | 2/2008 | Evans et al. ............... 348/36 |

FOREIGN PATENT DOCUMENTS

| JP | 09-022006 | 1/1997 |
| JP | 10-246869 | 9/1998 |
| JP | 2003-299121 | 10/2003 |
| JP | 2005-045323 A | 2/2005 |
| JP | 2005-234198 | 9/2005 |
| JP | 2006-171730 | 6/2006 |
| JP | 2006-221136 | 6/2006 |
| KR | 1020050025935 A | 3/2005 |

OTHER PUBLICATIONS

Japanese Office Action dated Nov. 24, 2009, corresponding to the Japanese Patent Application No. 2007-236417.
Korean Registration Determination Certificate issued Sep. 28, 2009, corresponding to the Korean Patent Application No. 10-2006-0088137.

* cited by examiner

*Primary Examiner* — Ramy M Osman
(74) *Attorney, Agent, or Firm* — Robert E. Bushnell, Esq.

(57) ABSTRACT

Provided is a dual view display panel including: a first vertical cell line, a second vertical cell line, a third vertical cell line, and a fourth vertical cell line. Each of the first and fourth vertical cell lines have a red cell, a blue cell and a green cell that are formed vertically in this order, and each of the second and third vertical cell lines have a green cell, a red cell and a blue cell that are formed vertically in this order. An upper edge of the green cell of the second vertical cell line is arranged around a vertical position of the center of the red cell of the first vertical cell line, and a lower edge of the green cell of the second vertical cell line is arranged around a vertical position of the center of the blue cell of the first vertical cell line. The cells of the first and fourth vertical cell lines are arranged in substantially identical positions, and the cells of the second and third vertical cell lines are arranged in substantially identical positions.

15 Claims, 2 Drawing Sheets

DUAL VIEW DISPLAY PANEL

CLAIM OF PRIORITY

This application makes reference to, incorporates the same herein, and claims all benefits accruing under 35 U.S.C. §119 from an application for DUAL VIEW DISPLAY PANEL earlier filed in the Korean Intellectual Property Office on Sep. 12, 2006 and there duly assigned Serial No. 10-2006-0088137.

BACKGROUND OF THE INVENTION

1. Field of the Invention

The present invention relates to a dual view display panel, and more particularly, to a dual view display panel which has an ideal screen ratio by improving a cell arrangement.

2. Description of the Related Art

In dual view display devices, a plurality of viewers do not watch one screen at the same time, but viewers who watch one display screen from different directions see different images. Dual view display devices are preferably used when individual users want to see different information from the same display. For example, when a driver in a car wants to see satellite navigation data, and on the other hand, passengers want to watch a movie, dual view display devices are used to satisfy these two requirements instead of using two display devices. In addition, in this case, dual view display devices can significantly reduce costs, space, and weight.

Dual view display has another advantage in that it can prevent users from seeing a different screen from one another. As such, dual view displays can be used in fields that require good data security, such as in ATMs, and can also be used in the field of computer gaming.

Dual view displays can also be applied to the design of a three-dimensional display.

When a conventional dual view display device is manufactured, one cell is formed in an arrangement of red (R), red (R), green (G), green (G), blue (B) and blue (B), and formed in a strip structure.

If the above mentioned structure is applied to a full high definition (HD) level display device having a resolution of 1920 by 1080, two images each having a resolution of 960 by 1080 can be realized, because the horizontal (or width) resolution of 1920 is divided by two. In general, when a spatial frequency ratio of width to height satisfies 4:3 or 16:9, the most ideal image can be realized. However, the conventional dual view display device has a resolution of 960 by 1080, and thus does not satisfy the ideal ratio.

SUMMARY OF THE INVENTION

The present invention provides a dual view display panel which has an ideal image ratio that satisfies the requirement in which the ratio of width to height is approximately 16:9 by improving a cell arrangement.

According to an aspect of the present invention, there is provided a dual view display panel including a first vertical cell line comprising a red cell, a blue cell, and a green cell which are formed along the first vertical cell line in this order, a fourth vertical cell line comprising a red cell, a blue cell, and a green cell which are formed along the fourth vertical cell line in this order where the red cell of the fourth vertical cell line is arranged at substantially the same vertical position as the red cell of the first vertical cell line, a second vertical cell line disposed between the first vertical cell line and the fourth vertical cell line, a third vertical cell line disposed between the second vertical cell line and the fourth vertical cell line, and a parallax barrier formed on an interface between the second vertical cell line and the third vertical cell line.

The second vertical cell line comprises a green cell, a red cell, and a blue cell which are formed along the second vertical cell line in this order. An upper edge of the green cell of the second vertical cell line is arranged around a vertical position of the center of the red cell of the first vertical cell line, and a lower edge of the green cell of the second vertical cell line is arranged around a vertical position of the center of the blue cell of the first vertical cell line. The third vertical cell line comprises a green cell, a red cell, and a blue cell which are formed along the third vertical cell line in this order. The green cell of the third vertical cell line is arranged at substantially the same vertical position as the green cell of the second vertical cell line.

A first image is displayed through the first vertical cell line and the second vertical cell line. A second image is displayed through the third vertical cell line and the fourth vertical cell line. The parallax barrier makes the first image being displayed in a first direction, and makes the second image being displayed in a second direction.

The dual view display device includes a plasma display panel, and the parallax barrier includes a barrier rib formed inside the plasma display panel.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, the present invention will be described in detail by explaining embodiments of the invention with reference to the attached drawings.

Figure 1:
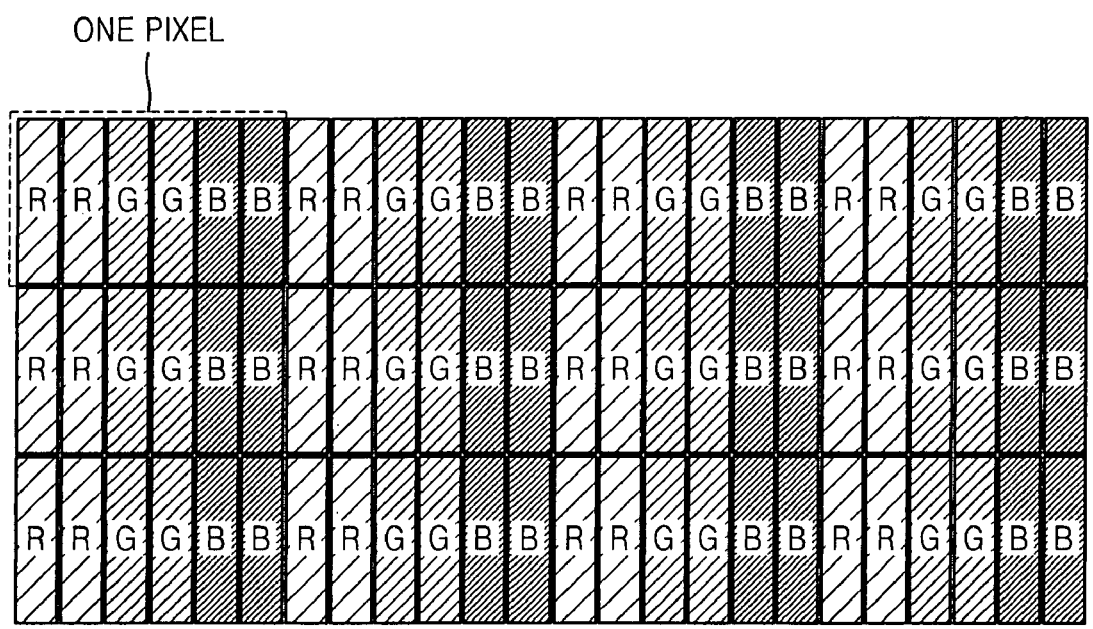
FIG. 1 is a diagram illustrating a regular rectangular cell arrangement structure of a dual view display device.
Figure 2:
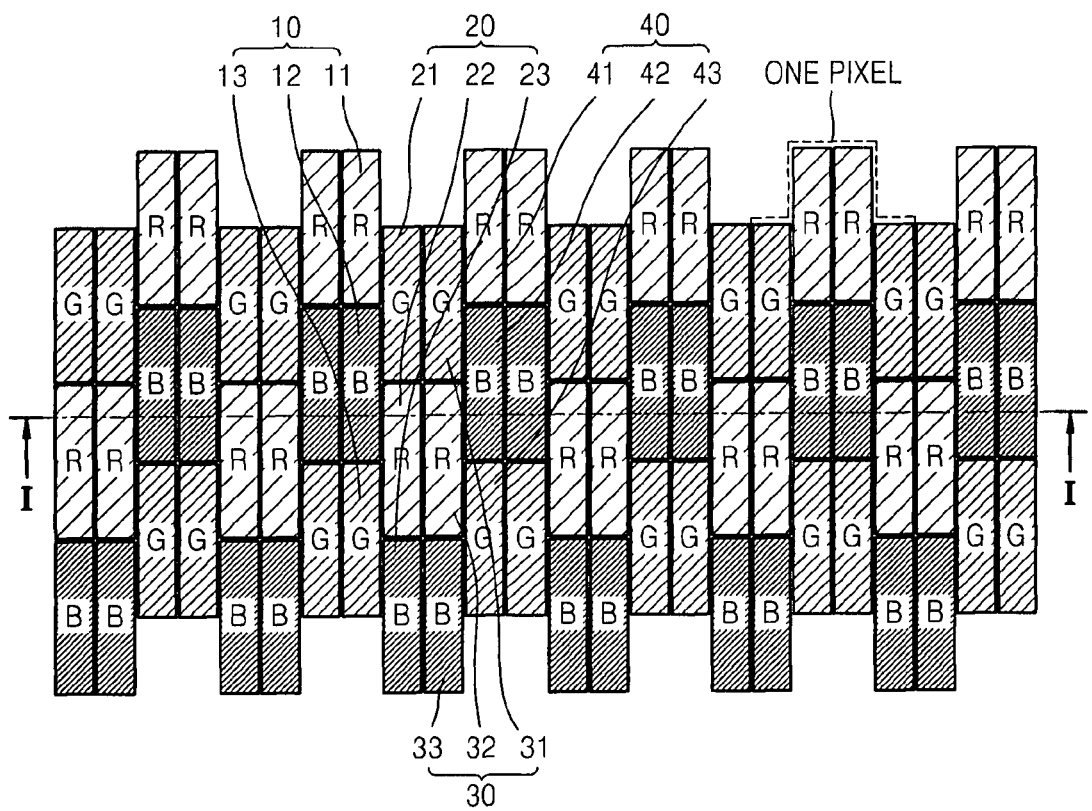
FIG. 2 is a diagram illustrating a cell arrangement structure of a dual view display device constructed as an embodiment of the present invention.
Figure 3:
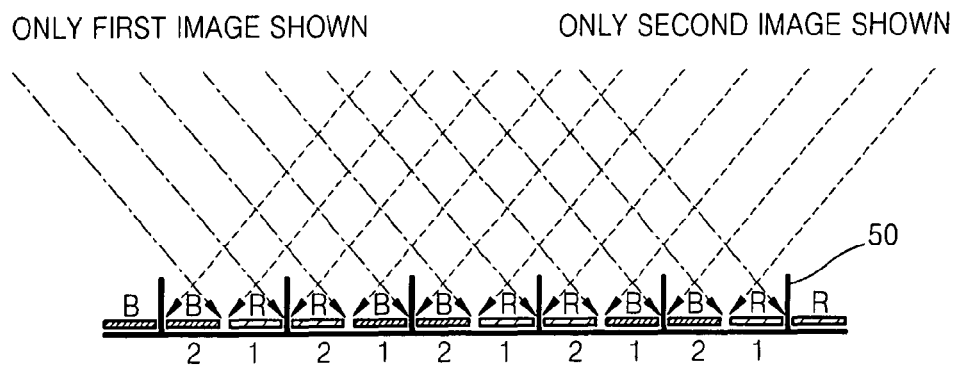
FIG. 3 is a schematic cross-sectional view taken along a line I-I of FIG. 2 in order to explain a principle of the dual view display device.

FIG. 1 is a diagram illustrating a regular rectangular cell arrangement structure of a dual view display device. FIG. 2 is a diagram illustrating a cell arrangement structure of a dual view display device constructed as an embodiment of the present invention. FIG. 3 is a schematic cross-sectional view taken along a line I-I of FIG. 2 in order to explain the principle of the dual view display device.

In the dual view display panel according to an embodiment of the present invention, which is illustrated in FIGS. 2 and 3, one pixel comprises an arrangement of red, red, green, green, blue and blue pixels unlike a single view display panel. Herein, red, green, and blue pixels (or cells) mean pixels (or cells) that display red, green, and blue colors, respectively.

As shown in FIG. 2, a first vertical cell line 10 comprises a red cell 11, a blue cell 12 and a green cell 13 which are vertically arranged in this order.

A second vertical cell line 20 is disposed next to the first vertical cell line 10, and comprises a green cell 21, a red cell 22 and a blue cell 23 which are vertically arranged in this order. The vertical positions of the green cell 21, red cell 22, and blue cell 23 of the second vertical cell line 20 are shifted along the vertical direction from the vertical positions of cells of the first vertical cell line 10. Herein, the top (upper edge) of the green cell 21 is positioned around the center of the red cell 11 of the first vertical cell line 10, and accordingly the bottom (lower edge) of the green cell 21 is positioned around the center of the blue cell 12 of the first vertical cell line 10, and the red cell 22 and the blue cell 23 are sequentially formed from the bottom of the green cell 21.

A third vertical cell line 30 is disposed next to the second vertical cell line 20, and comprises a green cell 31, a red cell 32 and a blue cell 33 which are formed to have the same form as the second vertical cell line 20. The vertical positions of the cells of the third cell line 30 are substantially the same as the vertical positions of the second cell line 20.

A fourth vertical cell line 40 is disposed next to the third vertical cell line 30, and comprises a red cell 41, a blue cell 42 and a green cell 43 which are formed to have the same form as the first vertical cell line 10. The vertical positions of the cells of the fourth cell line 40 are substantially the same as the vertical positions of the first cell line 10. Therefore, the vertical positions of the cells of the fourth cell line 40 are shifted from the vertical positions of the cells of the third cell line 30.

In the cell arrangement shown in FIG. 2, the red, blue, and green cells of the first, second, third, and fourth vertical cell lines have the same dimension. The cell arrangement of the present invention, however, can be made with the red, blue, and green cells of the vertical cell lines having different dimensions. The present invention provides a cell arrangement that can adjust the horizontal and vertical resolutions to more close to an idea resolutions for the HD displays in a dual view display device, and the red, blue, and green cells of the vertical cell lines can have different dimensions to optimize the image quality of the dual view display. Herein, the dimension of the cell means the width and height of each cell.

A parallax barrier 50 is needed for allowing a first image to be displayed in a first sight direction and a second image to be displayed in a second sight direction. In a plasma display panel, barrier ribs or additional layers can be used as the parallax barrier.

In the cell arrangement shown in FIG. 2, a parallax barrier can be formed on an interface between the second vertical cell line and the third vertical cell line. The meaning of "formed on an interface" in the present invention includes the meaning that the parallax barrier is formed on the interface but also can be a part of the interface.

If cells are arranged in a regular rectangular pattern as shown in FIG. 1, two images each having a resolution of 960×1080 are realized when a full HD level display device having a resolution of 1920×1080 is used as a duel view display device.

Display devices which display images may have a ratio of width to height of 4:3 or 16:9 in order to realize ideal images. However, the cells in the dual view display panel, which has a regular rectangular cell arrangement, are arranged in the ratio of 960:1080 which does not satisfy either of the above mentioned ratios.

FIGS. 1 and 2 are views of a cell arrangement structure of a dual view display panel, which has a regular rectangular cell arrangement, and a cell arrangement structure of a dual view display panel of the embodiment of the present invention, respectively, and the arrangements can be compared. The arrangements shown in FIGS. 1 and 2 are examples of the views showing only portions of pixel arrangements of the displays. From FIGS. 1 and 2, it can be observed that when one pixel comprises the arrangement of red, red, green, green, blue and blue cells, the total number of pixels in each of the cell arrangement structures is 12, which is the same in the dual view display panel having a regular rectangular cell arrangement and the dual view display panel of the present invention.

Referring to FIG. 1, it can be observed that the dual view display panel having a regular rectangular cell arrangement comprises 4 pixels in a horizontal (width or row) direction and 3 pixels in a vertical (height or column) direction. However, referring to FIG. 2, it can be observed that the dual cell display panel of the present invention has a cell arrangement structure which comprises 6 pixels in a horizontal direction and 2 pixels in a vertical direction.

Therefore, the dual view display panel of the present invention has an increased resolution in the horizontal direction which is 1.5 times bigger than that of the dual view display panel having a regular rectangular pattern shown in FIG. 1, due to an increase in pixel number from 4 to 6 along the horizontal direction, and has a reduced resolution in the vertical direction which is 1.5 times smaller than that of the dual view display panel having a regular rectangular cell arrangement, due to a decrease in pixel number from 3 to 2 along the vertical direction.

From the point of view of resolution, while the dual view display panel having a regular rectangular cell arrangement has a resolution of 960×1080 in a cell arrangement structure, the dual view display panel of the present invention has a resolution of 1440 in a horizontal direction (which is 1.5 times bigger than 960), and has a resolution of 720 in a vertical direction (which is 1.5 times smaller than 1080). That is, the dual view display panel of the present invention has a resolution of 1440×720. Therefore, the dual view display panel according to the current embodiment of the present invention has a ratio of width to height of 2:1, which is a ratio very close to 16:9.

The following table shows resolutions of a single view display device, a dual view display device having a regular rectangular cell arrangement structure, and a dual view display device according to an embodiment of the present invention, which are high definition (HD) level display devices.

Referring to the table, the dual view display device using a regular rectangular cell arrangement structure has the same resolution in a vertical direction as the single view display device. The dual view display device using a regular rectangular cell arrangement structure, however, has 50% reduced resolution from 1920 to 960 in a horizontal direction, and thus does not have an ideal screen ratio. However, the dual view display device of the present invention has a 67% reduced resolution from 1920 to 1440 in a horizontal direction, and a 75% reduced resolution from 1080 to 720 in a vertical direction in a cell arrangement. Accordingly, the ratio of width to height is much closer to 16:9 which is an ideal screen ratio.

Furthermore, the dual view display device according to the current embodiment of the present invention has the same results compared to the single view display device having other resolutions of 1366×768 and 1024×720.

| Single view display device | | Conventional dual view display device | | Dual view display view according to the present invention | |
|---|---|---|---|---|---|
| Horizontal Pixels | Vertical Pixels | Horizontal Pixels | Vertical Pixels | Horizontal Pixels | Vertical Pixels |
| 1920 | 1080 | 960 | 1080 | 1440 | 720 |
| 1366 | 768 | 683 | 768 | 1024.5 | 512 |
| 1024 | 720 | 512 | 720 | 768 | 480 |

A dual view display panel of the present invention can have an ideal screen ratio by improving a cell arrangement.

The cell arrangement proposed in the present invention can be used in any type of display device that is designed for the dual view display. Examples of the display device types include plasma display panels, organic light emitting displays, and liquid crystal displays. As shown in FIG. 3, a parallax barrier 50 may be necessary to separate multiple images from each other. In FIG. 3, the parallax barrier is illustrated as vertical barriers, but in the present invention, the parallax barrier includes any means that can be adopted to separate multiple images from each other. Examples of the parallax barrier include vertical barriers as shown in FIG. 3, and horizontal layers that partially cover the cells.

The cell arrangement proposed in the present invention can be applied to a plasma display panel (PDP). As known in the art, the PDP displays images by the use of the plasma discharge phenomenon. The PDP has a first substrate and a second substrate, and discharge cells that are formed in a space between the first and second substrates. Visible light is emitted from the discharge cells. A phosphor layer is formed inside each of the discharge cells to emit visible light having a specific color, such as red, green, and blue. Each of the red, green, and blue cells 11 through 43 illustrated in FIG. 2 can be a discharge cell in the PDP. Various forms of barrier ribs can be formed in the PDP to prevent cross-talk, and the barrier ribs can be designed to have a function of the parallax barriers.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A dual view display panel comprising:
   a first vertical cell line comprising a red cell, a blue cell, and a green cell which are formed along the first vertical cell line in this order;
   a fourth vertical cell line comprising a red cell, a blue cell, and a green cell which are formed along the fourth vertical cell line in this order, the red cell of the fourth vertical cell line being arranged at the same vertical position as the red cell of the first vertical cell line;
   a second vertical cell line disposed between the first vertical cell line and the fourth vertical cell line, the second vertical cell line comprising a green cell, a red cell, and a blue cell which are formed along the second vertical cell line in this order, an upper edge of the green cell of the second vertical cell line being arranged at a vertical position of the center of the red cell of the first vertical cell line, a lower edge of the green cell of the second vertical cell line being arranged at a vertical position of the center of the blue cell of the first vertical cell line;
   a third vertical cell line disposed between the second vertical cell line and the fourth vertical cell line, the third vertical cell line comprising a green cell, a red cell, and a blue cell which are formed along the third vertical cell line in this order, the green cell of the third vertical cell line being arranged at the same vertical position as the green cell of the second vertical cell line; and
   a parallax barrier making a first image being displayed in a first direction and making a second image being displayed in a second direction.

2. The dual view display panel of claim 1, wherein dimensions of the red cell, the green cell, and the blue cell of the first vertical cell line are substantially the same as dimensions of the red cell, the green cell, and the blue cell of the fourth vertical cell line, respectively.

3. The dual view display panel of claim 2, wherein dimensions of the red cell, the green cell, and the blue cell of the second vertical cell line are substantially the same as dimensions of the red cell, the green cell, and the blue cell of the third vertical cell line, respectively.

4. The dual view display panel of claim 3, wherein dimensions of the red cell, the green cell, and the blue cell of the first vertical cell line are substantially the same as dimensions of the red cell, the green cell, and the blue cell of the second vertical cell line, respectively.

5. The dual view display panel of claim 1, comprised of the parallax barrier formed between the second vertical cell line and the third vertical cell line.

6. The dual view display panel of claim 1, wherein the dual view display device is driven by plasma discharge.

7. The dual view display panel of claim 1, wherein the dual view display device includes a plasma display panel, and the parallax barrier includes a barrier rib formed inside the plasma display panel.

8. A dual view display panel comprising:
   a first vertical cell line comprising a red cell, a blue cell, and a green cell which are formed along the first vertical cell line in this order;
   a fourth vertical cell line comprising a red cell, a blue cell, and a green cell which are formed along the fourth vertical cell line in this order, the red cell of the fourth vertical cell line being arranged at the same vertical position as the red cell of the first vertical cell line;
   a second vertical cell line disposed between the first vertical cell line and the fourth vertical cell line, the second vertical cell line comprising a green cell, a red cell, and a blue cell which are formed along the second vertical cell line in this order, an upper edge of the green cell of the second vertical cell line being arranged in a vertical position between an upper edge and a lower edge of the red cell of the first vertical cell line, a lower edge of the green cell of the second vertical cell line being arranged in a vertical position between an upper edge and a lower edge of the blue cell of the first vertical cell line;
   a third vertical cell line disposed between the second vertical cell line and the fourth vertical cell line, the third vertical cell line comprising a green cell, a red cell, and a blue cell which are formed along the third vertical cell line in this order, the green cell of the third vertical cell line being arranged at the same vertical position as the green cell of the second vertical cell line; and
   a parallax barrier making a first image being displayed in a first direction and making a second image being displayed in a second direction.

9. The dual view display panel of claim 8, wherein the upper edge of the green cell of the second vertical cell line is arranged around a vertical position of the center of the red cell of the first vertical cell line, and the lower edge of the green cell of the second vertical cell line is arranged around a vertical position of the center of the blue cell of the first vertical cell line.

10. The dual view display panel of claim 8, wherein dimensions of the red cell, the green cell, and the blue cell of the first vertical cell line are substantially the same as dimensions of the red cell, the green cell, and the blue cell of the fourth vertical cell line, respectively.

11. The dual view display panel of claim 10, wherein dimensions of the red cell, the green cell, and the blue cell of the second vertical cell line are substantially the same as dimensions of the red cell, the green cell, and the blue cell of the third vertical cell line, respectively.

12. The dual view display panel of claim 11, wherein dimensions of the red cell, the green cell, and the blue cell of the first vertical cell line are substantially the same as dimensions of the red cell, the green cell, and the blue cell of the second vertical cell line, respectively.

13. The dual view display panel of claim 8, comprised of the parallax barrier formed between the second vertical cell line and the third vertical cell line.

14. The dual view display panel of claim 8, wherein the dual view display device is driven by plasma discharge.

15. The dual view display panel of claim 8, wherein the dual view display device includes a plasma display panel, and the parallax barrier includes a barrier rib formed inside the plasma display panel.

* * * * *